(12) United States Patent
Auernhammer et al.

(10) Patent No.: US 8,972,667 B2
(45) Date of Patent: Mar. 3, 2015

(54) EXCHANGING DATA BETWEEN MEMORY CONTROLLERS

(75) Inventors: Florian Alexander Auernhammer, Adliswil (CH); Victoria Caparros Cabezas, Zurich (CH); Andreas Christian Doering, Zufikon (CH); Patricia Maria Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/534,063

(22) Filed: Jun. 27, 2012

(65) Prior Publication Data

US 2013/0007375 A1 Jan. 3, 2013

(30) Foreign Application Priority Data

Jun. 28, 2011 (EP) .................................. 11171757

(51) Int. Cl.
*G06F 12/00* (2006.01)
*G06F 12/08* (2006.01)
*G06F 12/16* (2006.01)
*G06F 13/16* (2006.01)

(52) U.S. Cl.
CPC ..................................... *G06F 13/16* (2013.01)
USPC ..... 711/141; 711/154; 711/162; 711/E12.026; 711/E12.103

(58) Field of Classification Search
CPC ....... G06F 9/455; G06F 17/24; G06F 21/566; G06F 21/602; G06F 3/041; G06F 8/67; G06F 12/0831; G06F 12/0817; G06F 12/0813; G06F 12/0815; G06F 12/0811

USPC .......... 711/141, 154, 162, E12.026, E12.103
See application file for complete search history.

(56) References Cited

U.S. PATENT DOCUMENTS

| | | | |
|---|---|---|---|
| 7,680,968 | B2 | 3/2010 | Burton |
| 7,882,479 | B2 | 2/2011 | Bartley et al. |
| 7,886,103 | B2 | 2/2011 | Nishtala et al. |
| 7,913,022 | B1 | 3/2011 | Baxter |
| 7,925,826 | B2 | 4/2011 | Brittain et al. |
| 8,443,211 | B2 | 5/2013 | Zhao et al. |
| 2008/0005514 | A1 | 1/2008 | Kurokawa et al. |
| 2009/0216960 | A1 | 8/2009 | Allison et al. |
| 2009/0307416 | A1 | 12/2009 | Luo et al. |
| 2010/0161914 | A1 | 6/2010 | Eilert et al. |
| 2011/0040935 | A1 | 2/2011 | Murayama et al. |
| 2011/0239196 | A1 | 9/2011 | Ichard |
| 2012/0001926 | A1* | 1/2012 | Patel et al. ................... 345/503 |
| 2012/0216029 | A1* | 8/2012 | Shah et al. .................... 713/100 |

OTHER PUBLICATIONS

Tassadaq Hussain, et al., Reconfigurable Memory Controller with Programmable Pattern Support, WRC 2011.
D.G. Bair, et al., Functional Verification of the Z990 Superscalar, Multibook Microprocessor Complex, IBM Journal of Research and Dev., May 2004, pp. 347-365, vol. 48, Issue 3.

* cited by examiner

*Primary Examiner* — Yong Choe
(74) *Attorney, Agent, or Firm* — Derek S. Jennings; Patent Mining Works, LLC

(57) ABSTRACT

A device with an interconnect having a plurality of memory controllers for connecting the plurality of memory controllers. Each memory controller of the plurality of memory controllers is coupled to an allocated memory for storing data. Further, each memory controller of the plurality of memory controllers has one accelerator of a plurality of accelerators for mutually exchanging data over the interconnect.

13 Claims, 8 Drawing Sheets

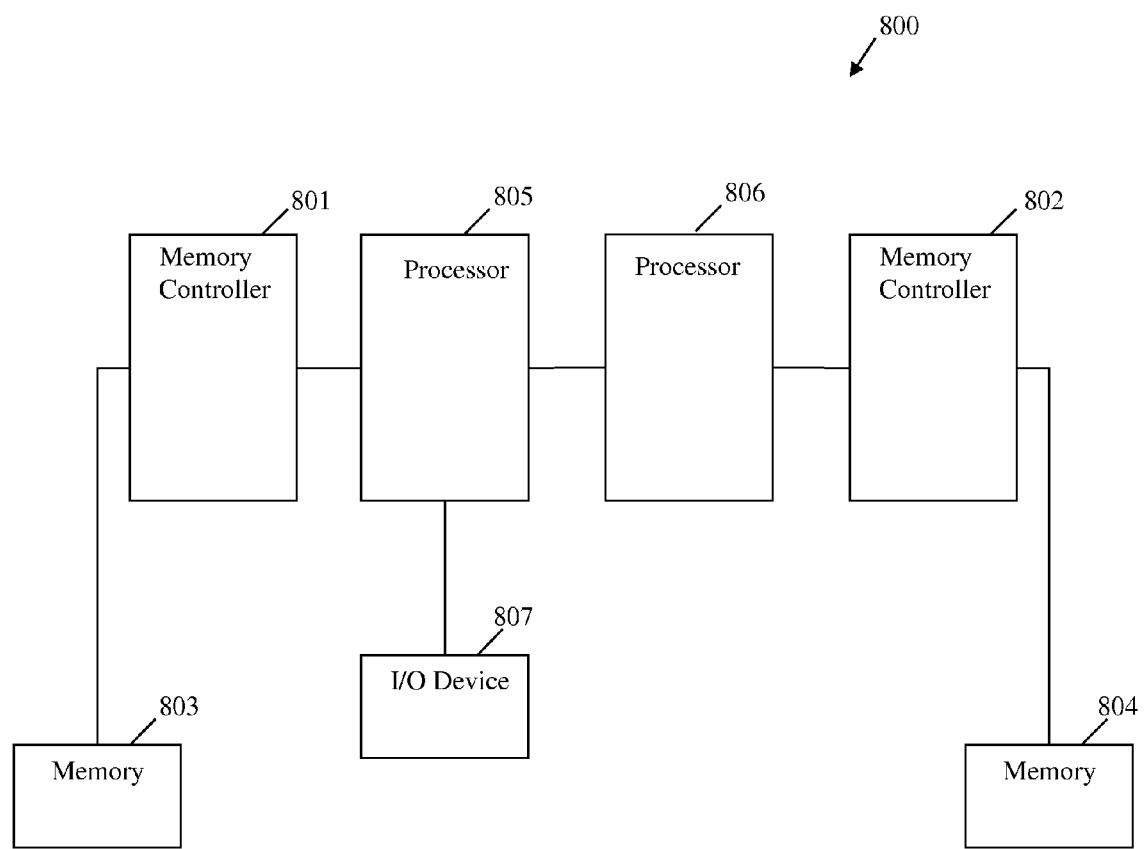
Fig. 8 (State of the Art)

US 8,972,667 B2

EXCHANGING DATA BETWEEN MEMORY CONTROLLERS

CROSS REFERENCE TO RELATED APPLICATION

This application claims priority under 35 U.S.C. 119 from European Application 11171757.5, filed Jun. 28, 2011, the entire contents of which are incorporated herein by reference.

BACKGROUND OF THE INVENTION

1. Field of the Invention

The invention relates to a device and to a method for exchanging data between memory controllers.

2. Description of the Related Art

From a cost and power point of view, the throughput between processor and memory is one of the most limited resources in a conventional computer. Virtualization, I/O processing (I/O; Input/Output), parallel processing, checkpointing and other techniques require memory operations with significant processing, such as memory-to-memory copying.

In conventional computer systems, since memory is exclusively connected to the processor or processor chip, these operations occupy processor-to-memory bandwidth. In past systems, the detailed operations of the memory, e.g. bank open, read, write, refresh, are controlled by the memory controller on the processor chip.

However, in upcoming conventional systems, the memory controller is moved into a separate chip that may be integrated with the memory chip on Dual Inline Memory Modules (DIMM). This may allow a more autonomous operation of the memory.

Typically, if several memory modules are present in one system, the memory modules are used in an interleaved way. This offers a good balancing over the memory channels when continuous addresses are accessed. This address assignment scheme rules out most memory operations carried out locally on one memory module only. For instance, if a list needs to be traversed, e.g. queues of an I/O device in virtual memory, the list elements would be distributed over several memory modules.

For example, FIG. 8 shows a schematic block diagram of a conventional device 800 for exchanging data between memory controllers 801 and 802. Each memory controller 801, 802 is coupled to a memory 803, 804. Further, each memory controller 801, 802 is coupled to a processor 805, 806 or processor chip. The processors 805, 806 are coupled to each other. If the memory controller 801 wants to exchange data with the memory controller 802, it has to transmit the data over the processors 805 and 806.

Further, an I/O device 807 may be a part of the device 800. For example, the I/O device 807 can be coupled to the processor 805. If the I/O device 807 wants to write into a memory, for example memory 803, it has to transmit the data over the processor 805.

Thus, the processor-to-memory bandwidth is limited in any case of transmitting data between the memory controllers 801 and 802.

Accordingly, it is an aspect of the present invention to improve the exchange of data between memory controllers.

BRIEF SUMMARY OF THE INVENTION

In order to overcome these deficiencies, the present invention provides a device for exchanging data, including: a plurality of memory controllers, wherein each memory controller of the plurality of memory controllers is coupled to an allocated memory for storing data; and an interconnect for connecting the plurality of memory controllers, wherein each memory controller of the plurality of memory controllers has one accelerator of a plurality of accelerators for mutually exchanging data over the interconnect.

According to another aspect, the present invention provides a method for exchanging data between a plurality of memory controllers, wherein each memory controller of the plurality of memory controllers is coupled to an allocated memory for storing data, the method including: connecting the plurality of memory controllers by an interconnect, and exchanging data between the memory controllers of the plurality of memory controllers over the interconnect directly.

BRIEF DESCRIPTION OF THE SEVERAL VIEWS OF THE DRAWINGS

FIG. 8 shows a schematic block diagram of a conventional device for exchanging data between memory controllers.

Similar or functionally similar elements in the figures have been allocated the same reference signs if not otherwise indicated.

DETAILED DESCRIPTION OF THE PREFERRED EMBODIMENTS

Figure 1:
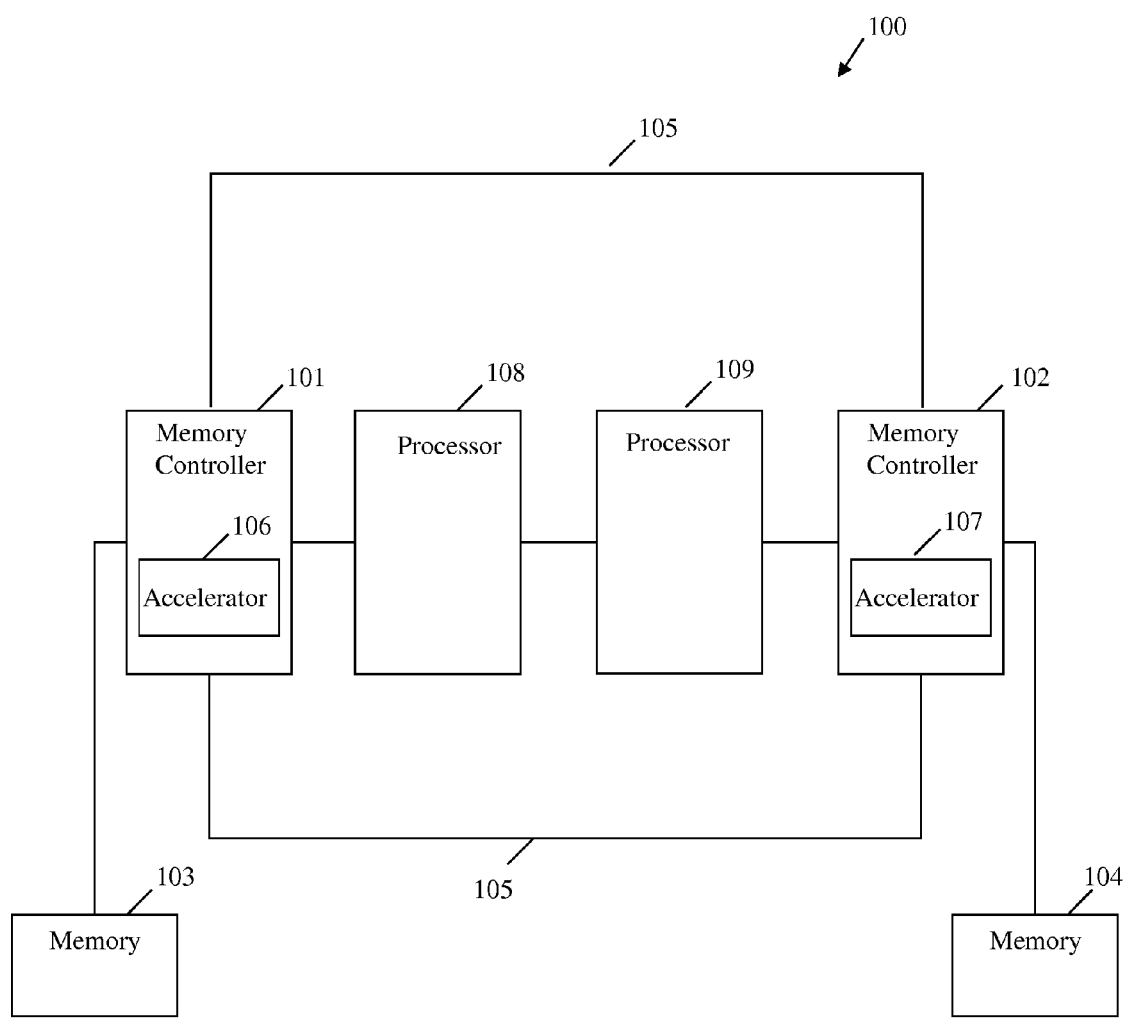
FIG. 1 shows a schematic block diagram of a first embodiment of a device for exchanging data between memory controllers.

In FIG. 1, a schematic block diagram of a first embodiment of a device 100 for exchanging data between memory controllers 101, 102 is depicted.

Without loss of generality, the number of memory controllers 101, 102 is 2 in FIG. 1. In general, the device 100 may have a plurality N of memory controllers (N 2).

Each memory controller 101, 102 is coupled to an allocated memory 103, 104 for storing data. In FIG. 1, the memory controller 101 is coupled to the memory 103. In an analogous way, the memory controller 102 is coupled to the memory 104.

Further, the device 100 has an interconnect 105 for connecting the plurality of memory controllers 101, 102 directly. As shown in FIG. 1, the interconnect 105 is embodied as a ring or memory ring for connecting the plurality of memory controllers 101, 102 in a ring structure.

Each memory controller 101, 102 has one accelerator 106, 107. The accelerators 106, 107 are configured to mutually exchange data over the interconnect 105.

Moreover, the device 100 can have a plurality of processors 108, 109. Without loss of generality, FIG. 1 shows two processors 108, 109 coupled between the memory controllers 101, 102. In general, the device 100 may have a plurality N of processors (N≥2).

Figure 2:
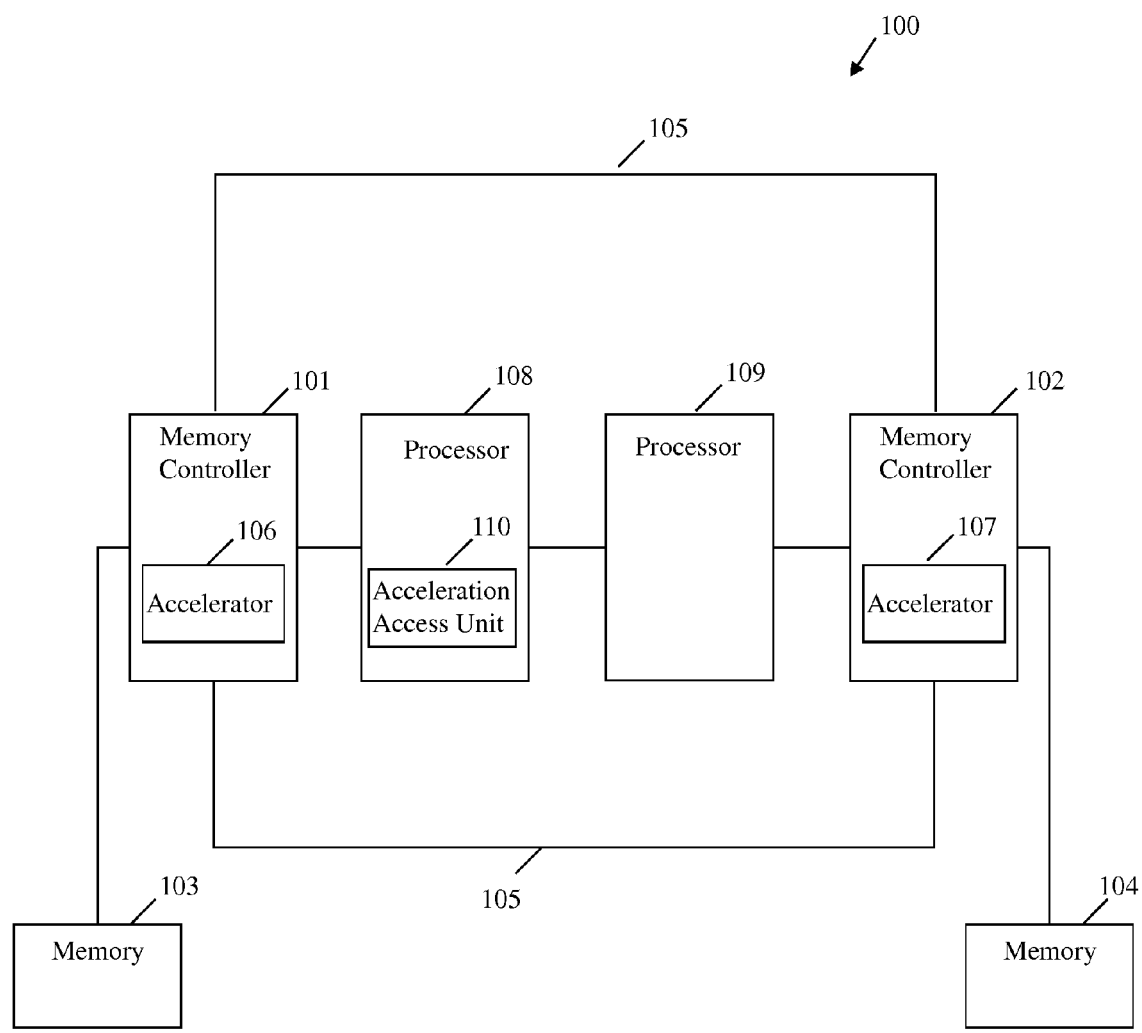
FIG. 2 shows a schematic block diagram of a second embodiment of a device for exchanging data between memory controllers.

FIG. 2 shows a schematic block diagram for a second embodiment of a device 100 for exchanging data between memory controllers 101, 102.

The second embodiment of the device 100 of FIG. 2 includes all features of the device 100 of FIG. 1. Moreover, at least one processor of the plurality of the processors 108, 109 has an acceleration access unit 110. With respect to FIG. 2, the processor 108 includes the acceleration access unit 110. The acceleration access unit 110 is configured to carry out a cache coherency protocol with the accelerators 106, 107 of the memory controllers 101, 102.

As a result, the accelerators 106, 107 can be configured to carry out deterministic operations on data stored in the memories 103, 104. For example, the respective accelerator 106, 107 may carry out deterministic operations for marking phases of garbage collection in the allocated memory 103, 104. As another example, the respective accelerator 106, 107 may carry out deterministic operations for copying data stored in the allocated memory 103, 104. Further examples for such deterministic operations which may be carried out by the accelerators 106, 107 are deterministic operations for replicating data structures stored in the allocated memory 103, 104, deterministic operations for filling memory blocks in the allocated memory 103, 104, and deterministic operations for erasing memory blocks in the allocated memory 103, 104.

Figure 3:
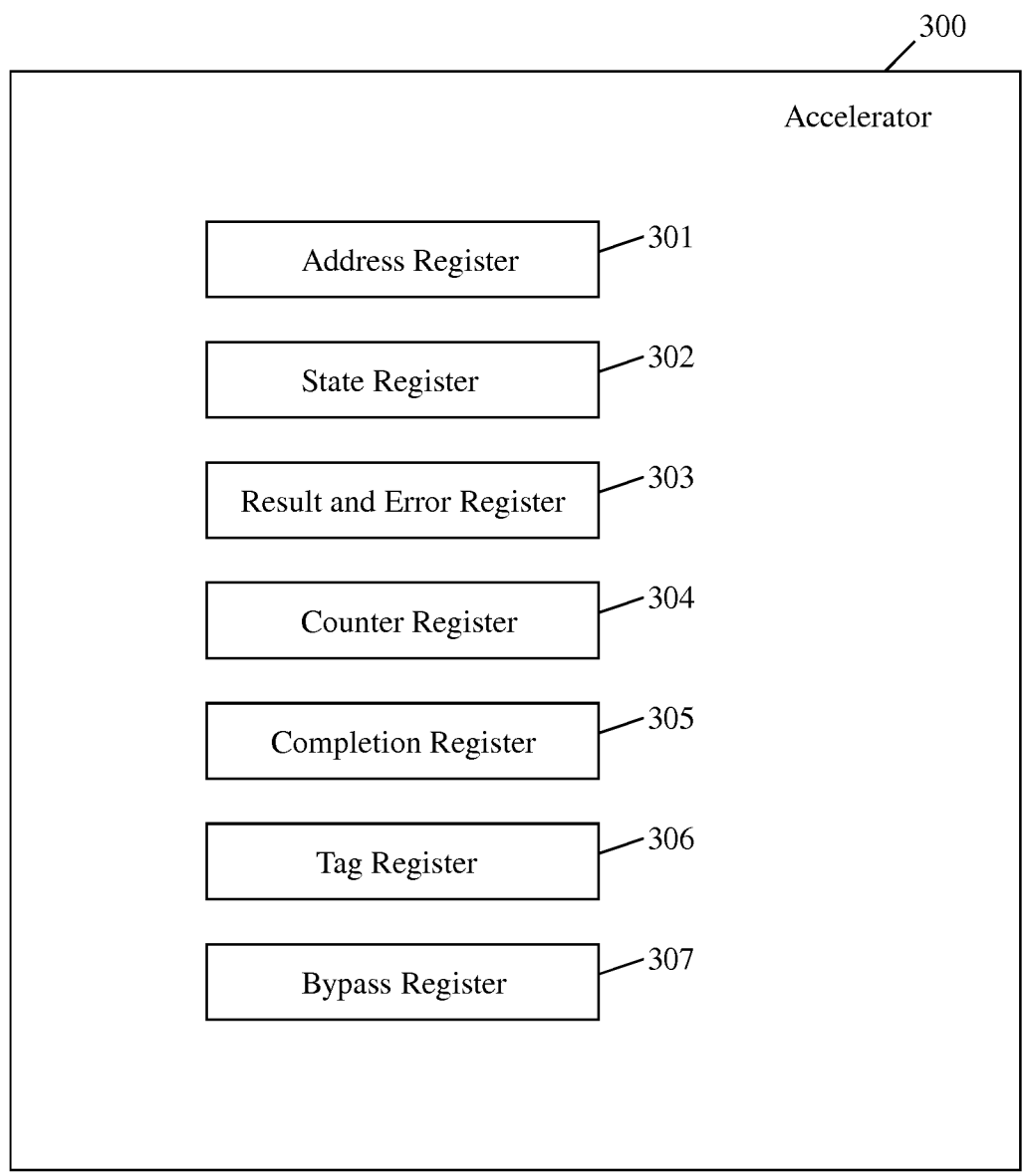
FIG. 3 shows a schematic block diagram of an embodiment of an accelerator of a memory controller.

Because the accelerators 106, 107 can carry out a cache coherency protocol with the acceleration access unit 110, the accelerators 106, 107 can also be configured to carry out concurrent deterministic operations. For carrying out these concurrent deterministic operations, the respective accelerator 106, 107 can have a set of registers. In this regard, FIG. 3 depicts a schematic block diagram of an embodiment of an accelerator 300 of a memory controller. The accelerator 300 of FIG. 3 can be an embodiment for the accelerators 106, 107 of FIGS. 1 and 2.

In particular, the accelerator 300 has at least one address register 301. The address register 301 can store memory addresses of the memories 103, 104. Further, the accelerator 300 can have at least one state register 302 for storing states of the allocated memory or of all memories of the memory ring.

Further, the accelerator 300 has at least one result and error register 303 which is configured to manage the concurrent deterministic operations. Also, at least one counter register 304 can be provided for managing the deterministic operations for filling memory blocks and/or the deterministic operations for erasing memory blocks.

Furthermore, the accelerator 300 may have at least one completion register 305 for managing a number of completion indications. Each completion indication can indicate a completion of a certain deterministic operation.

Also, a tag register 306 can be provided for managing a number of deterministic operations by a number of tags. The tags are configured to determine operation slots for the number of deterministic operations.

Finally, the accelerator 300 can include at least one bypass register 307 for bypassing the tag register 306 such that the number of predefined deterministic operations are prioritized compared to the number of deterministic operations being managed by the tag register 306.

Figure 4:
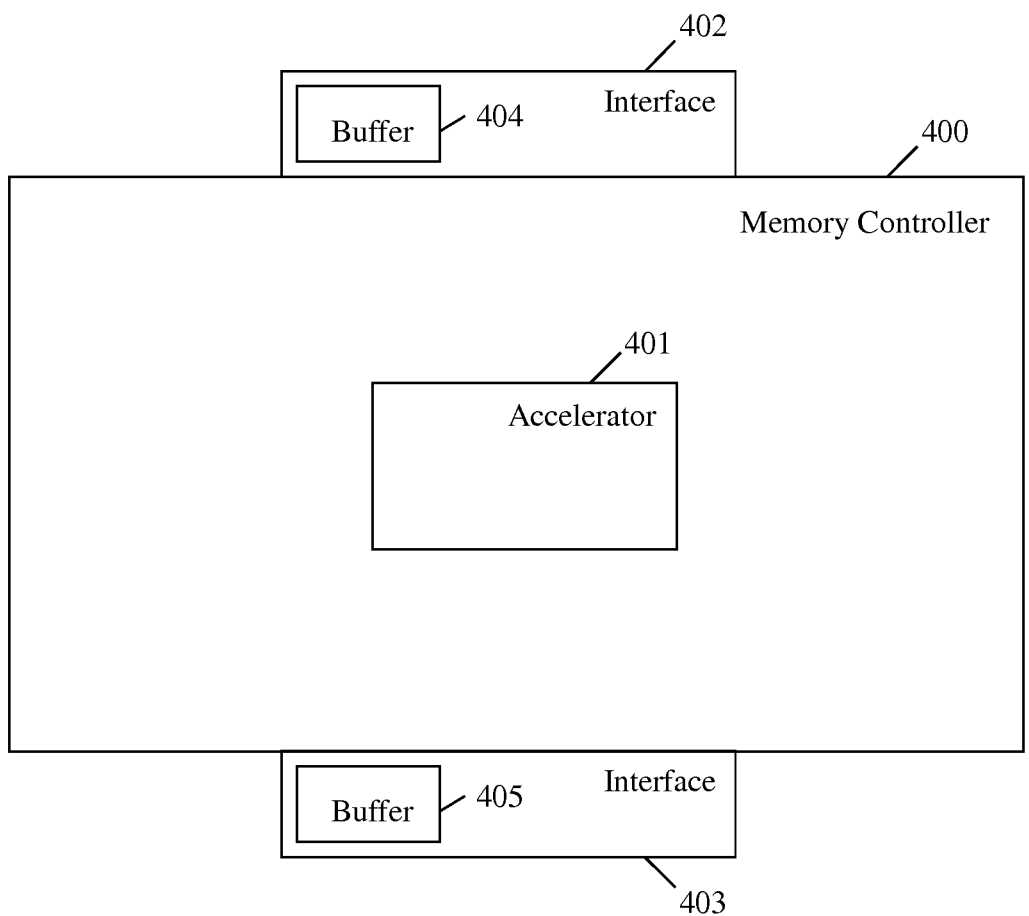
FIG. 4 shows a schematic block diagram of an embodiment of a memory controller.

In FIG. 4, a schematic block diagram of an embodiment of a memory controller 400 is depicted. The memory controller 400 of FIG. 4 can be an embodiment for the memory controllers 101, 102 of FIGS. 1 and 2.

Figure 5:
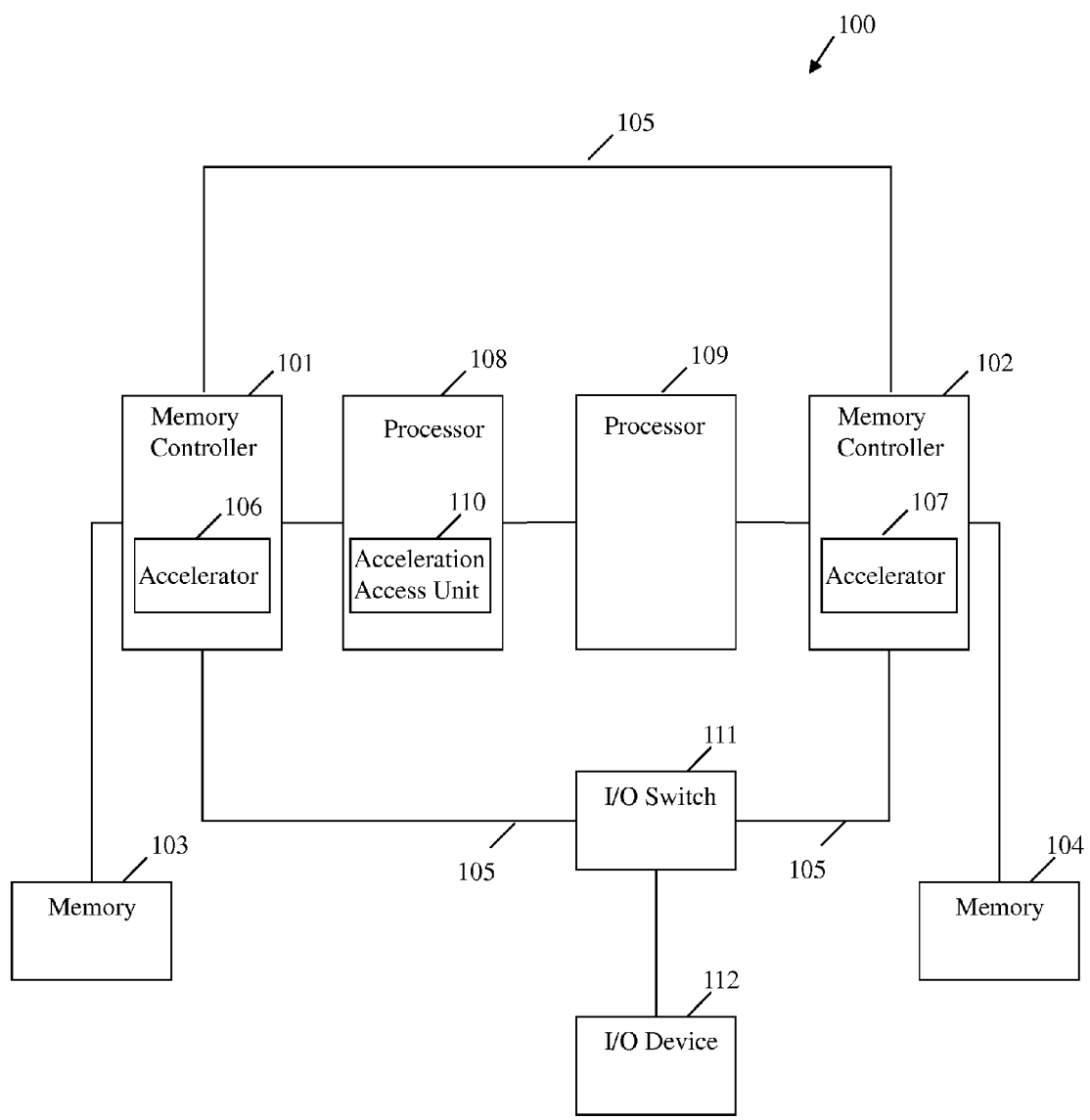
FIG. 5 shows a schematic block diagram of a third embodiment of a device for exchanging data.

The memory controller 400 has an accelerator 401 and two interfaces 402, 403 for interfacing the interconnect 105 (not shown). The respective interface 402, 403 has a buffer 404, 405 for preventing a deadlock between concurrent deterministic operations. In FIG. 5, a schematic block diagram of a third embodiment of the device 100 for exchanging data between memory controllers 101, 102 is illustrated. The third embodiment of the device 100 of FIG. 5 includes all the features of the second embodiment of the device 100 of FIG. 2. Additionally, the device 100 of FIG. 5 has an I/O switch 111. The I/O switch 111 is connected to the interconnect 105. Further, at least one I/O device 112 is connected to the I/O switch 111. Without loss of generality, FIG. 5 shows only one I/O device 112. In general, the device 100 may have a plurality N of I/O devices (N≥2). By means of the I/O switch 111, the I/O device 112 is adapted to directly access the memory controllers 101, 102 over the interconnect 105.

Figure 6:
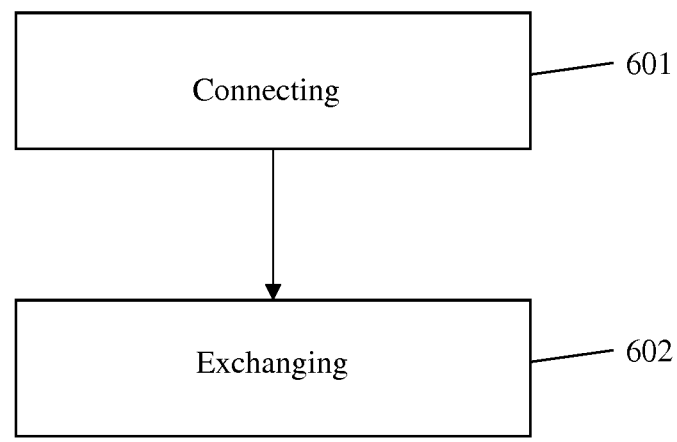
FIG. 6 shows an embodiment of a sequence of method steps for exchanging data between memory controllers.

Furthermore, FIG. 6 shows an embodiment of a sequence of method steps for exchanging data between memory controllers. Each memory controller is coupled to an allocated memory for storing data (see FIGS. 1, 2 and 5).

In step 601, the plurality of memory controllers is connected to an interconnect. In step 602, data is exchanged between the memory controllers over the interconnect directly.

Computerized devices can be suitably designed for implementing embodiments of the present invention as described herein. In that respect, it can be appreciated that the methods described herein are largely non-interactive and automated. In embodiments, the methods described herein can be implemented either in an interactive, partly-interactive or non-interactive system. The methods described herein can be implemented in software (e.g., firmware), hardware, or a combination thereof. In embodiments, the methods described herein are implemented in software, as an executable program, the latter executed by suitable digital processing devices. In further embodiments, at least one step or all steps of the above method of FIG. 6 may be implemented in software, as an executable program, the latter executed by suitable digital processing devices. In further embodiments, the exchanging step of the above method of FIG. 6 is implemented in software. More generally, embodiments of the present invention can be implemented wherein general-purpose digital computers, such as personal computers, workstations, etc., are used.

Figure 7:
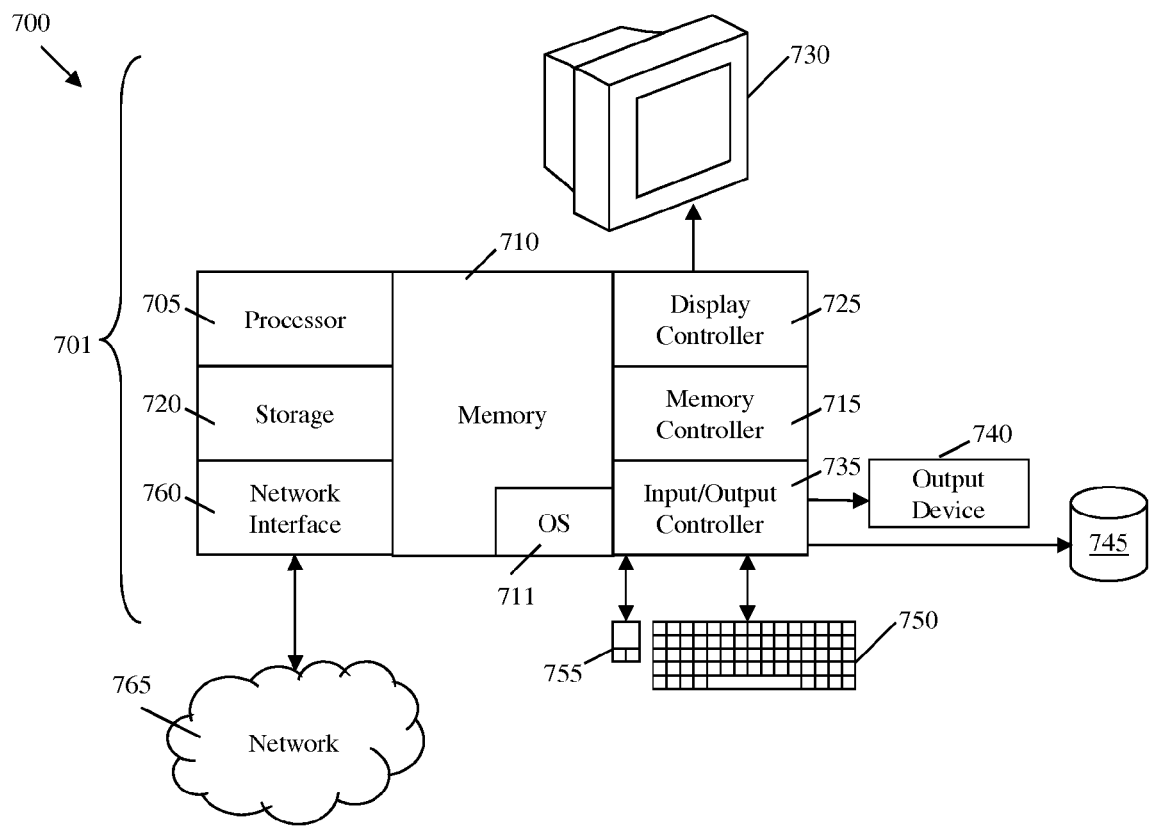
FIG. 7 shows a schematic block diagram of an embodiment of a system adapted for performing the method for exchanging data between memory controllers.

For instance, the system 700 depicted in FIG. 7 schematically represents a computerized unit 701, e.g., a general-purpose computer. In embodiments, in terms of hardware architecture, as shown in FIG. 7, the unit 701 includes a processor 705, memory 710 coupled to a memory controller 715, and one or more input and/or output (I/O) devices 740, 745, 750, 755 (or peripherals) that are communicatively coupled via a local input/output controller 735. The input/output controller 735 can be, but is not limited to, one or more buses or other wired or wireless connections, as is known in the art. The input/output controller 735 can have additional elements, which are omitted for simplicity, such as controllers, buffers (caches), drivers, repeaters, and receivers, to enable communications. Further, the local interface can include address, control, and/or data connections to enable appropriate communications among the aforementioned components. For example, the I/O device 740 can include or implement an accelerator of one of FIG. 1, 2, or 5. Also, the I/O device 745 can include or implement an accelerator of one of FIG. 1, 2, or 5. Moreover, the input/output controller 735 can include or implement an accelerator of one of FIG. 1, 2, or 5.

The processor 705 is a hardware device for executing software, particularly that which is stored in memory 710. The processor 705 can be any custom made or commercially available processor, a central processing unit (CPU), an auxiliary processor among several processors associated with the computer 701, a semiconductor based microprocessor (in the form of a microchip or chip set), or generally any device for executing software instructions.

The memory 710 can include any one or combination of volatile memory elements (e.g., random access memory) and nonvolatile memory elements. Moreover, the memory 710 can incorporate electronic, magnetic, optical, and/or other types of storage media. Note that the memory 710 can have a distributed architecture, where various components are situated remotely from one another, but can be accessed by the processor 705.

The software in memory 710 can include one or more separate programs, each of which includes an ordered listing of executable instructions for implementing logical functions. In the example of FIG. 7, the software in the memory 710 includes methods described herein in accordance with exemplary embodiments and a suitable operating system (OS) 711. The OS 711 essentially controls the execution of other computer programs, such as the methods as described herein (e.g., FIG. 6), and provides scheduling, input-output control, file and data management, memory management, and communication control and related services.

The methods described herein can be in the form of a source program, executable program (object code), script, or any other entity including a set of instructions to be performed. When in a source program form, the program needs to be translated via a compiler, assembler, interpreter, or the like, as known per se, which may or may not be included within the memory 710, so as to operate properly in connection with the OS 711. Furthermore, the methods can be written as an object oriented programming language, which has classes of data and methods, or a procedure programming language, which has routines, subroutines, and/or functions.

In an embodiment, a conventional keyboard 750 and mouse 755 can be coupled to the input/output controller 735. Other I/O devices 740-755 can include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 735 for further processing. Sensor nodes are ideally small, consume low energy, are autonomous and operate unattended.

In addition, the I/O devices 740-755 can further include devices that communicate both inputs and outputs. The system 700 can further include a display controller 725 coupled to a display 730. In embodiments, the system 700 can further include a network interface or transceiver 760 for coupling to a network 765.

The network 765 transmits and receives data between the unit 701 and external systems. The network 765 is possibly implemented in a wireless fashion, e.g., using wireless protocols and technologies, such as WiFi, WiMax, etc. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 765 can also be an IP-based network for communication between the unit 701 and any external server, client and the like via a broadband connection. In exemplary embodiments, network 765 can be a managed IP network administered by a service provider. Besides, the network 765 can be a packet-switched network such as a LAN, WAN, Internet network, etc.

If the unit 701 is a PC, workstation, intelligent device or the like, the software in the memory 710 can further include a basic input output system (BIOS). The BIOS is stored in ROM so that the BIOS can be executed when the computer 701 is activated.

When the unit 701 is in operation, the processor 705 is configured to execute software stored within the memory 710, to communicate data to and from the memory 710, and to generally control operations of the computer 701 pursuant to the software. The methods described herein and the OS 711, in whole or in part are read by the processor 705, typically buffered within the processor 705, and then executed. When the methods described herein (e.g. with reference to FIG. 6) are implemented in software, the methods can be stored on any computer readable medium, such as storage 720, for use by or in connection with any computer related system or method.

As will be appreciated by one skilled in the art, aspects of the present invention can be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention can take the form of a computer program product embodied in one or more computer readable medium(s) having computer readable non-transient program code embodied thereon. Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable non-transient program code embodied therein, for example, in baseband or as part of a carrier wave. Such a propagated signal may take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Non-transient program code embodied on a computer readable medium can be transmitted using any appropriate medium, including but not limited to wireless, wireline, optical fiber cable, RF, etc., or any suitable combination of the foregoing.

Computer non-transient program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The non-transient program code may execute entirely on the unit 701, partly thereon, partly on a unit 701 and another unit 701, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed is:

1. A device for exchanging data, comprising:
a plurality of memory controllers, wherein each memory controller of said plurality of memory controllers is coupled to an allocated memory for storing data; and
an interconnect for connecting said plurality of memory controllers,
wherein each memory controller of said plurality of memory controllers has one accelerator of a plurality of accelerators for mutually exchanging data over said interconnect, wherein each accelerator of said plurality of accelerators is configured to carry out a plurality of concurrent deterministic operations for at least one of: marking phases of garbage collection in said allocated memory, copying data stored in said allocated memory, replicating data structures stored in said allocated memory, filling memory blocks in said allocated memory, and erasing memory blocks in said allocated memory; and wherein each accelerator of said plurality of accelerators has a set of registers for carrying out said concurrent deterministic operations.

2. The device according to claim 1, wherein said interconnect is embodied as a ring for connecting said plurality of memory controllers in a ring structure.

3. The device according to claim 1, further comprising:
a plurality of processors, wherein each processor of said plurality of processors is coupled between at least two memory controllers of said plurality of memory controllers.

4. The device according to claim 3, wherein at least one processor of said plurality of processors has an acceleration access unit, wherein said acceleration access unit is configured to carry out a cache coherency protocol with said accelerators of said plurality of memory controllers.

5. The device according to claim 1, wherein each accelerator of said plurality of accelerators is configured to carry out deterministic operations on data.

6. The device according to claim 1, wherein said set of registers includes at least one address register for storing memory addresses of said allocated memories and at least one state register for storing states of said allocated memories.

7. The device according to claim 6, wherein said set of registers further comprises at least one result and error register for managing said concurrent deterministic operations.

8. The device according to claim 6, wherein said set of registers further comprises at least one counter register for managing at least one of said deterministic operations for filling memory blocks and said deterministic operations for erasing memory blocks.

9. The device according to claim 6, wherein said set of registers further comprises at least one completion register for managing a number of completion indications, wherein each completion indication of said number of completion indications indicates a completion of a certain deterministic operation.

10. The device according to claim 6, wherein said set of registers further comprises:
a tag register for managing a number of deterministic operations by a number of tags, wherein said tags are configured to determine operation slots for said number of deterministic operations.

11. The device according to claim 10, wherein said set of registers further comprises at least one bypass register for bypassing the said register such that a number of predefined deterministic operations are prioritized compared to said number of deterministic operations being managed by said tag register.

12. The device according to claim 1,
wherein each memory controller of said plurality of memory controllers has an interface for interfacing said interconnect; and
wherein said interface comprises a buffer for preventing a deadlock between said concurrent deterministic operations.

13. The device according to claim 1, further comprising:
an I/O switch connected to said interconnect, wherein said I/O switch is connected to a number of I/O devices such that said number of I/O devices is adapted to directly access said memory controllers over said interconnect.

* * * * *